United States Patent
Yang et al.

(10) Patent No.: US 11,718,284 B2
(45) Date of Patent: Aug. 8, 2023

(54) STEERING CONTROL SYSTEM

(71) Applicant: Volvo Car Corporation, Gothenburg (SE)

(72) Inventors: Derong Yang, Gothenburg (SE); Mats Jonasson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 10 days.

(21) Appl. No.: 17/320,713

(22) Filed: May 14, 2021

(65) Prior Publication Data
US 2022/0363243 A1    Nov. 17, 2022

(51) Int. Cl.
*B60W 30/045* (2012.01)
*B60W 60/00* (2020.01)
(Continued)

(52) U.S. Cl.
CPC .......... *B60W 30/045* (2013.01); *B60W 10/08* (2013.01); *B60W 10/20* (2013.01);
(Continued)

(58) Field of Classification Search
CPC .... B60W 30/045; B60W 10/08; B60W 10/20; B60W 40/072; B60W 40/114;
(Continued)

(56) References Cited

U.S. PATENT DOCUMENTS 5,504,403 A * 4/1996 McLaughlin ........ B62D 5/0463
                                                           318/434
5,704,446 A * 1/1998 Chandy ................ B62D 5/0466
                                                            701/41
(Continued)

FOREIGN PATENT DOCUMENTS

CN    109533019 A    3/2019
CN    110239617 A    9/2019
(Continued)

OTHER PUBLICATIONS

JP-2016141318-A translation (Year: 2016).*
Extended EP Search Report for EP Application No. 22170443.0 dated Oct. 10, 2023.

*Primary Examiner* — Jeff A Burke
*Assistant Examiner* — Kyle T Johnson
(74) *Attorney, Agent, or Firm* — Amin, Turocy & Watson, LLP

(57) ABSTRACT

The present disclosure relates to a steering control system for a vehicle, a vehicle comprising such a steering control system and a method for operating such a steering control system for a vehicle. The steering control system comprises a frequency filter unit, a first control unit, and a second control unit. The frequency filter unit comprises a high pass filter and a low pass filter. The frequency filter unit is configured to receive a request for a steering angle and filter the request into a low-pass filtered request and a high-pass filtered request. The first control unit is configured to determine a first controlling torque based on the low-pass filtered request the second control unit is configured to determine a second controlling torque based on the high-pass filtered request. The first control unit is different of the second control unit.

20 Claims, 3 Drawing Sheets

(51) Int. Cl.
  *B60W 10/08* (2006.01)
  *B60W 10/20* (2006.01)
  *B60W 40/072* (2012.01)
  *B60W 40/114* (2012.01)
  *B60W 50/10* (2012.01)
  *B62D 5/04* (2006.01)
  *B62D 15/02* (2006.01)

(52) U.S. Cl.
  CPC ........ *B60W 40/072* (2013.01); *B60W 40/114* (2013.01); *B60W 50/10* (2013.01); *B60W 60/001* (2020.02); *B62D 5/0463* (2013.01); *B62D 15/021* (2013.01); *B60W 2510/20* (2013.01); *B60W 2520/14* (2013.01); *B60W 2520/30* (2013.01)

(58) Field of Classification Search
  CPC .............. B60W 50/10; B60W 60/001; B60W 2510/20; B60W 2520/14; B60W 2520/30; B62D 5/0463; B62D 15/021
  See application file for complete search history.

(56) References Cited

U.S. PATENT DOCUMENTS

| | | | | |
|---|---|---|---|---|
| 6,789,641 | B2* | 9/2004 | McLaughlin | B62D 5/0463 |
| | | | | 701/42 |
| 8,560,154 | B2* | 10/2013 | Hansen | B60W 10/08 |
| | | | | 701/22 |
| 9,586,619 | B1 | 3/2017 | Akatsuka et al. | |
| 10,435,028 | B2* | 10/2019 | Herrera | B60W 40/11 |
| 2003/0024759 | A1* | 2/2003 | Williams | B62D 5/0463 |
| | | | | 180/443 |
| 2003/0182039 | A1 | 9/2003 | Chandy | |
| 2008/0208411 | A1* | 8/2008 | Broecker | B62D 5/0472 |
| | | | | 701/42 |
| 2010/0004824 | A1* | 1/2010 | Ikeda | B62D 5/0463 |
| | | | | 701/42 |
| 2016/0200354 | A1* | 7/2016 | Kimura | B62D 5/0472 |
| | | | | 701/42 |
| 2016/0236679 | A1* | 8/2016 | Inoue | B60W 30/045 |
| 2017/0088166 | A1 | 3/2017 | Kunihiro et al. | |
| 2017/0210414 | A1* | 7/2017 | Sato | B62D 5/0463 |
| 2019/0276073 | A1 | 9/2019 | Pramod et al. | |
| 2020/0039576 | A1* | 2/2020 | Shoji | B62D 5/0463 |
| 2021/0206424 | A1* | 7/2021 | Nakakuki | B62D 5/0463 |
| 2021/0276619 | A1* | 9/2021 | Gaudszun | B62D 15/021 |
| 2021/0394823 | A1* | 12/2021 | Kim | B60W 50/00 |
| 2022/0363243 | A1* | 11/2022 | Yang | B62D 15/021 |

FOREIGN PATENT DOCUMENTS

| | | | |
|---|---|---|---|
| JP | 2016141318 A | * | 8/2016 |
| JP | 2019104401 A | | 6/2019 |
| KR | 20190037530 A | | 4/2019 |

* cited by examiner

STEERING CONTROL SYSTEM

TECHNICAL FIELD

The present disclosure relates to a steering control system for a vehicle, a vehicle comprising such a steering control system and a method for operating such a steering control system for a vehicle.

BACKGROUND ART

Sensors arranged in a vehicle produce generally noises when measuring, for example, vehicle position, orientation, acceleration, and velocity signals due to a vehicle motion and/or environmental influences. This may affect a smooth steering-wheel motion of a vehicle operating having an autonomous driving function. Generally, a steering wheel of such a vehicle behaves nervous in order to keep the vehicle within a desired path in contrast to a skilled human driver who has the ability to control the vehicle with a smooth steering action.

Therefore, it is challenging to compromise between a path tracking precision and a nervous steering wheel activity. Non-smooth steering wheel motion may also cause an unnecessary anxiety of the human driver and/or passenger. Additionally, immense efforts and costs are required to calibrate path control functions used by a number of autonomous customer functions.

SUMMARY

There may be a need to provide an improved steering control system, which facilitates more precise and smooth steering action.

The problem is solved by the subject matters of the independent claims of the present disclosure, wherein further embodiments are incorporated in the dependent claims. It should be noted that the aspects of the disclosure described in the following apply to the steering control system for a vehicle, a vehicle comprising such a steering control system and a method for operating such a steering control system for a vehicle.

According to the present disclosure, a steering control system for a vehicle is presented. The steering control system comprises a frequency filter unit, a first control unit, and a second control unit. The frequency filter unit comprises a high pass filter and a low pass filter. The frequency filter unit is configured to receive a request for a steering angle and filter the request into a low-pass filtered request and a high-pass filtered request. The first control unit is configured to determine a first controlling torque based on the low-pass filtered request the second control unit is configured to determine a second controlling torque based on the high-pass filtered request. The first control unit is different to the second control unit.

The steering control system according to the present disclosure allows a smooth and more precise steering action of the vehicle. By separating a request for a steering motion into a low-pass filtered request and a high-pass filtered request, the request may be more efficiently processed and the steering action may be executed without any high frequency content, which would cause a nervous behavior of the steering control system and/or vehicle. Further, a use of two different control units enables an improved control of a desired path and capturing a fast-changing steering request with a fast-response torque control. Moreover, tuning and calibration efforts for the steering action may be reduced.

The frequency filter unit may be configured to perform a signal processing such as a request for a steering angle. In general, vehicles comprise various sensors to detect an operation state of the vehicles such as a position, orientation and/or speed of the vehicle in real-time. Such a measurement, however, may comprise environmental noises, which may affect to a determination of a steering angle and cause a nervous behavior of the steering control system and/or vehicle. Since conventional systems comprise only a single control system for steering a vehicle, the request for a steering angle may not be implemented accurately and/or a nervous behavior may not be avoided.

In contrast, according to the present disclosure, the demand or the request may be sent to the frequency filter unit, as soon as a path control system of the vehicle identifies a demand to change a driving direction of the vehicle or receives the request to perform a steering action. In response to the demand or the request, the frequency filter unit may filter it into a high-pass filtered request and a low-pass filtered request by means of the high pass filter and the low pass filter. The high pass filter may allow high frequencies of the request to pass and low frequencies of the request to attenuate and the low pass filter may allow low frequencies of the request to pass and high frequencies of the request to attenuate.

The first control unit may receive the low-pass filtered request and determine the first controlling torque. Hence, the first control unit may be adapted to calculate a reliable controlling torque for the low-pass filtered request. Further, the second control unit may receive the high-pass filtered request and determine the second controlling torque. Hence, the second control unit may be adapted to calculate a reliable controlling torque for the high-pass filtered request. Accordingly, the first control unit and the second control unit may not be the same due to the different requests having a distinct character to be processed.

The first control unit and the second control unit may not only be arranged physically differently, for example through a separate arrangement in the steering control system, but also process the received request in a different manner. For example, the first control unit may comprise a steering angle controller and the second control unit may comprise a torque vectoring control or vice versa.

In an embodiment, the first control unit is a steering angle controller. The steering angle controller is configured to receive the low-pass filtered request and determine a steering torque as the first controlling torque. The low-pass filtered request of the steering angle may be transferred from the frequency filter unit to the steering angle controller. The steering angle controller may detect a current steering angle and determine a suitable steering torque of, for example wheels coupled to a front axle steering system of the vehicle, based on the desired driving path and/or an information of the path control system.

In an embodiment, the steering control system further comprises a steering actuator configured to receive the steering torque determined by the steering angle controller and to steer wheels of the vehicle. The steering torque determined by the steering angle controller may be transferred to the steering actuator, which may convert a signal of electrically specified steering torque into a mechanical adjustment of the steering angle for the wheels coupled with a steerable vehicle axle. The steerable vehicle axle may be arranged in a front side of the vehicle.

In an embodiment, the steering actuator is an electric power assist steering (EPAS) assembly or a steer-by-wire (SbW) system. In the EAPS assembly, the steering wheel and the wheels to be steered are connected mechanically to provide a steering feel at the steering wheel. In contrast, the steer-by-wire (SbW) system does not comprise any mechanical/physical linkages between the steering wheel and the wheels to be steered and applies electric signals instead, which control actuators. The steering actuator may comprise an electric motor in either a rotary or a linear type or an electromechanical servo unit to accomplish a steering motion of the wheels, consequently the vehicle.

In an embodiment, the second control unit is a torque vectoring controller. The torque vectoring controller is configured to receive the high-pass filtered request and to determine wheel torques as the second controlling torque. The high-pass filtered request of the steering angle may be transferred from the frequency filter unit to the torque vectoring controller. The torque vectoring controller, in other words a differential braking technique may enhance a vehicle stability particularly during a steering or cornering motion of the vehicle. The torque vectoring controller may operate as a virtual steering controller which may provide a turning radius of the vehicle without using any steering system.

In an embodiment, the torque vectoring controller comprises a yaw torque controller. The yaw torque controller is configured to receive the high-pass filtered request and a current steering angle and to determine a yaw torque based on a steering angle error. The high-pass filtered request is a steering or yaw torque request. The torque vectoring controller may generate a yaw torque on the vehicle by applying different longitudinal forces, i.e. by applying drive or brake torques to individual wheels of the vehicle. The individual wheel torque may be applied in order to provide a length force neutral yaw torque such that a vehicle speed can be maintained along with a desired steering or cornering motion of the vehicle.

The yaw torque controller may comprise a sensor unit comprising, for example a gyroscope, and a processing circuitry unit for determining the yaw torque in comparison to the current steering angle of the vehicle. In particular, the processing circuitry unit may determine a set of indirect yaw torque parameters indicative of an indirect vehicle yaw torque contribution from lateral wheel forces based on current wheel torque data and lateral acceleration data.

In an embodiment, the yaw torque controller may be a model-based controller designed to translate steering wheel rate and/or the actual steering angle to one part of yaw torque request. Additionally, the yaw torque controller may compensate the steering angle error or deviation to the yaw torque request.

In an embodiment, the torque vectoring controller further comprises a wheel torque allocator. The wheel torque allocator is configured to receive the yaw torque determined by the yaw torque controller and determine the wheel torque. The wheel torque may be calculated based on a relationship between the yaw torque request and a desired longitudinal wheel torque as a steering input.

In an embodiment, the wheel torque is calculated for at least a total wheel torque required for front axle wheels and at least a total wheel torque required for rear axle wheels.

In an embodiment, the wheel torque may be calculated for at least the total wheel torque required for the front axle wheels and the wheel torque required for each of the rear axle wheels individually. In an embodiment, the wheel torque may be calculated for each of front axle wheels individually and at least the total wheel torque required for the rear axle wheels. Still in an embodiment, the wheel torque may be calculated for each of front axle wheels individually and the wheel torque required for each of rear axle wheels individually.

The term "total wheel torque" may be understood as a sum of the wheel torques to be allocated to each wheel of the respective axle. Accordingly, the wheel torque allocator may determine at least a sum of the wheel torques to be provided to the front axle and at least a sum of the wheel torques to be provided to the rear axle of the vehicle. The wheels coupled with the front axle and the rear axle respectively may be actuated by means of equally or proportionally differently divided total wheel torque determined for each axle.

However, the wheel torque allocator may determine an individual wheel torque of the respective axle based on the desired longitudinal wheel torque and a target vehicle yaw. The torque vectoring controller may be combined with an all-wheel drive capability which may provide a possibility to apply individual torques independently to individual wheels on the same axle. In other words, the calculated toques may be applied individually to each of the wheels independent of each other to drive each wheel independent of the other wheels.

In an embodiment, the wheel torque allocator is connected to a wheel torque actuator to allocate the determined wheel torque. The wheel torque actuator may provide propulsion to operate the wheels according to the calculated wheel torques during the steering or cornering motion of the vehicle without reducing the speed of the vehicle. Each of the front axle and the rear axle of the vehicle may comprise at least one wheel torque actuator. Alternatively, wheels coupled to the front axle and/or the rear axle of the vehicle may comprise their individual wheel torque actuator.

In an embodiment, the wheel torque actuator is an electric machine. The electric machine, in other words, electric motor may apply the determined wheel torque for the front axle wheels and the rear axle wheels. Additionally or alternatively, the wheel torques determined for the front axle wheels may be applied by one electric machine for each front wheel and/or the wheel torques determined for the rear axle wheels may be applied by one electric machine for each rear wheel. Further, at least one axle of the vehicle may be also operated by an internal combustion engine instead of the electric machine.

In an embodiment, the steering control system further comprises at least one environment sensor and a path controller. The environment sensor is configured to provide vehicle and/or road information to the path controller and the path controller is configured to provide the request for a steering angle to the frequency filter unit. The vehicle information may be, for example, a vehicle position, orientation, acceleration, speed, current steering angle and/or current wheel torque applied on each of the wheels and the road information may be, for example, traffic signs, traffic lights and/or congestion situation on the road. The path controller may collect all information and transfer the request for a steering angle by comparing the current situation of the vehicle with the desired path.

In an embodiment, the steering control system further comprises a vehicle motion sensor between the environment sensor and the path controller. The vehicle motion sensor is configured to measure noise of the vehicle information relative to the desired path to the path controller. Accordingly, the vehicle motion sensor may process and transfer the vehicle information received from the environment sensor in relation to the desired path and measured noise.

In an embodiment, a cut-off frequency of the high pass filter and the low pass filter are the same. When the request for a steering request may be filtered by the frequency filter unit, a lower cut-off frequency of the high pass filter and an upper cut-off frequency of the low pass filter may be the same frequency, such that the request may be reliably separated by the low-pass filtered request and the high-pass filtered request to facilitate further processes.

According to the present disclosure, a further steering control system for a vehicle is presented. The steering control system comprises a frequency filter unit, a first control unit, and a second control unit. The frequency filter unit comprises a high pass filter and a low pass filter. The frequency filter unit is configured to receive a request for driving a curvature and filter the request into a low-pass filtered request and a high-pass filtered request. The first control unit is configured to determine a first controlling torque based on the low-pass filtered request the second control unit is configured to determine a second controlling torque based on the high-pass filtered request. The first control unit is different of the second control unit.

The steering control system may perform not only steering angle but also driving curvature. The curvature request may indicate a desired curvature along with a driving path of the vehicle. In a steady-state cornering, for example, there may be basically a transfer function between a curvature request and a steering angle request.

In an embodiment, the curvature request is an arbitration of a human driver's curvature request and estimated curvature request. The curvature request may be an arbitrated request of the human driver's curvature request and the request identified, for example by the path control system of the vehicle. The arbitrated curvature request may be input to the frequency filter unit. The frequency filter unit may filter the arbitrated curvature request into a high-pass filtered curvature request and a low-pass filtered curvature request by means of the high pass filter and the low pass filter, respectively.

In an embodiment, the first control unit is a steering angle controller. The steering angle controller is configured to receive the low-pass filtered curvature request and determine a steering torque as the first controlling torque for driving the curvature. In an embodiment, the second control unit is a torque vectoring controller comprising a yaw torque controller and a wheel torque allocator. The torque vectoring controller is configured to receive the high-pass filtered curvature request and determine a wheel torque based on a yaw torque.

A steering actuator of the steering control system may be configured to receive the determined steering torque and to steer wheels of the vehicle. A wheel torque actuator of the steering control system may be configured to allocate the determined wheel torque to the respective wheel.

Accordingly, a smooth and more precise driving a curvature of the vehicle may be performed. Further, a use of two different control units enables an improved control of a desired path and capturing a fast-changing steering request with a fast-response torque control. Moreover, tuning and calibration efforts for the steering action may be reduced.

According to the present disclosure, also a vehicle is presented. The vehicle comprises the steering control system comprising a frequency filter unit, a first control unit, and a second control unit. The frequency filter unit comprises a high pass filter and a low pass filter. The frequency filter unit is configured to receive a request for a steering angle and filter the request into a low-pass filtered request and a high-pass filtered request. The first control unit is configured to determine a first controlling torque based on the low-pass filtered request the second control unit is configured to determine a second controlling torque based on the high-pass filtered request. The first control unit is different of the second control unit.

In an embodiment, the vehicle is a driver-assisted vehicle or an autonomous vehicle. The driver-assisted vehicle may refer to a vehicle providing a continuous assistance to the driver such as speed control and/or steering assistance and the driver remains actively in the driving task. The vehicle may be also an automated or autonomous vehicle enabling the vehicle to take full control of speed and direction. By means of such assistance systems, the vehicle allows a smooth and more precise steering action.

In an embodiment, the vehicle is guided by adjusting a wheel angle determined by the first control unit in case of the low-pass filtered request. In an embodiment, the vehicle is guided by adjusting a wheel torques determined by the second control unit in case of the high-pass filtered request. The first control unit, i.e. steering angle controller may determine a steering torque based on the low-pass filtered request and the second control unit, i.e. torque vectoring controller determine a wheel torque based on the high-pass filtered request.

According to the present disclosure, also a method for operating a steering control system for a vehicle is presented. The method comprises the steps of, but not necessarily in this order:
receiving a request for a steering angle,
filtering the request by a low pass filter and/or a high pass filter,
determining a first controlling torque based on a low-pass filtered request, and
determining a second controlling torque based on a high-pass filtered request.

It should be noted that the above embodiments may be combined with each other irrespective of the aspect involved. Accordingly, the method may be combined with structural features and, likewise, the system may be combined with features described above with regard to the method.

These and other aspects of the present disclosure will become apparent from and elucidated with reference to the embodiments described hereinafter.

BRIEF DESCRIPTION OF DRAWINGS

Exemplary embodiments of the disclosure will be described in the following with reference to the following drawings.

DESCRIPTION OF EMBODIMENTS

Figure 1:
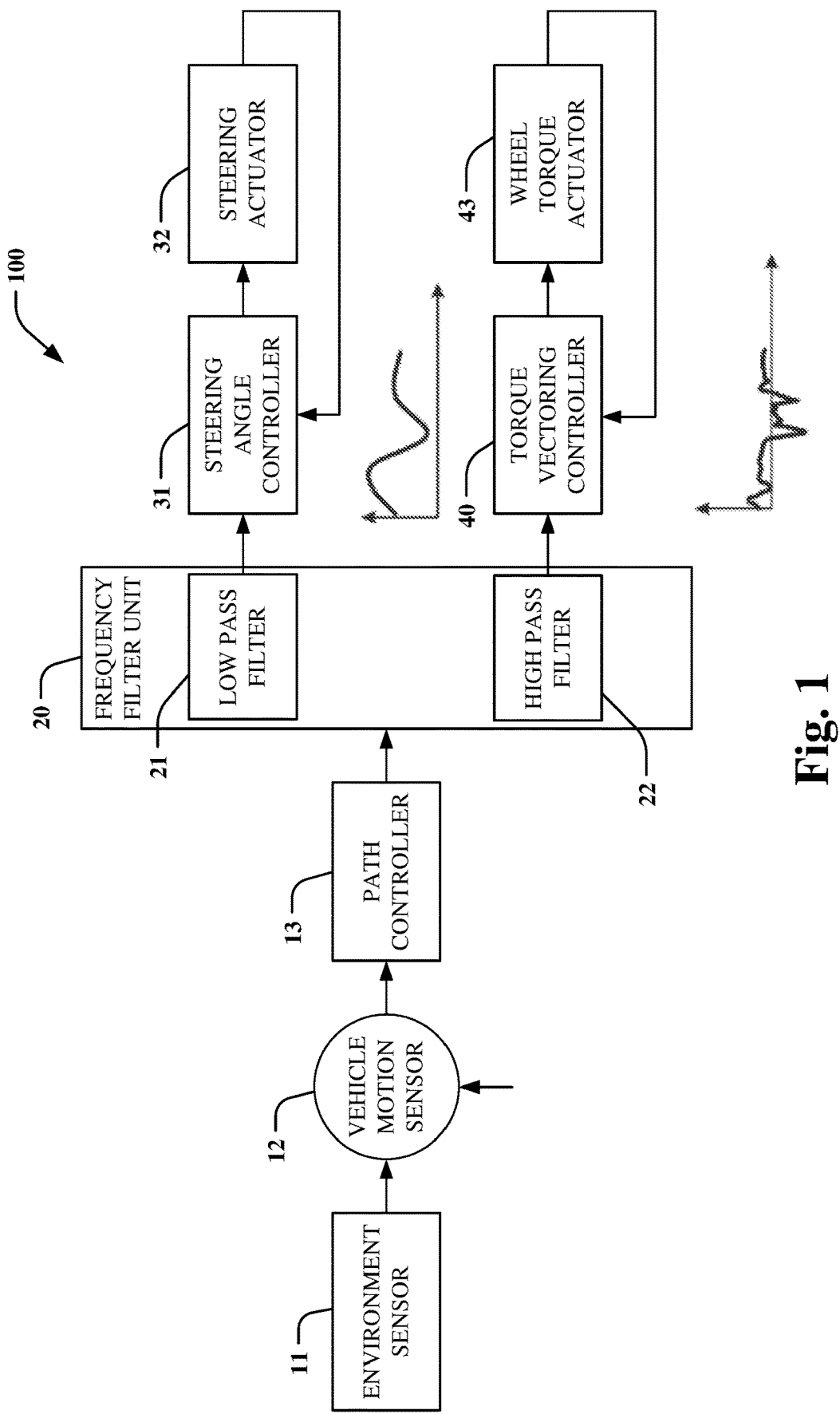
FIG. 1 shows schematically and exemplarily an embodiment of a steering control system according to the present disclosure.

FIG. 1 shows the steering control system 100 for processing a request for a steering angle. The steering control system 100 may be integrated in a vehicle 200, in particular a driver-assisted vehicle or an autonomous vehicle. The steering control system 100 comprises at least one environment sensor 11 and a path controller 13. The environment sensor 11 is configured to provide vehicle 200 and road information to the path controller 13 and the path controller 13 is configured to provide a request for the steering angle to a frequency filter unit 20. The steering control system 100 further comprises a vehicle motion sensor 12 between the environment sensor 11 and the path controller 13 for measuring noises of vehicle information relative to a desired path to the path controller 13.

The frequency filter unit 20 comprises a low pass filter 21 and a high pass filter 22. The frequency filter unit 20 is configured to receive the request for a steering angle and filter the request into a low-pass filtered request by the low pass filter 21 and a high-pass filtered request by the high pass filter 22.

A steering angle controller 31 receives the low-pass filtered request and determines a steering torque based on the low-pass filtered request. A steering actuator 32 receives the steering torque determined by the steering angle controller 31 and steer wheels 210 of the vehicle accordingly. The steering actuator 32 may be an electric power assist steering (EPAS) assembly or a steer-by-wire system.

The torque vectoring controller 40 comprises a yaw torque controller 41 and a wheel torque allocator 42. The yaw torque controller 41 receives the high-pass filtered request and a current steering angle of the wheels 210. Based on this information, the yaw torque controller 41 determines a steering angle error, accordingly a yaw torque of the vehicle 200. In other words, the yaw torque may be determined in view of a desired rotation 51 and a current rotation 52.

Figure 2A:
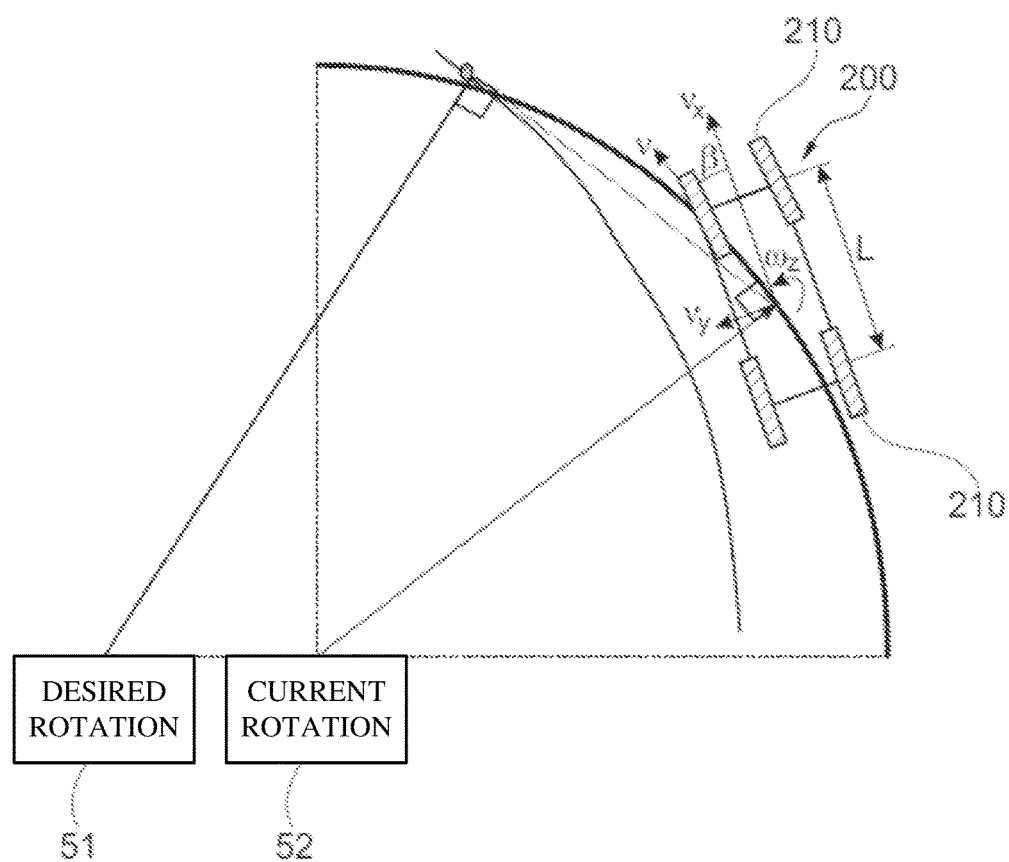
FIG. 2a and FIG. 2b show schematically and exemplarily an embodiment of a torque vectoring control according to the present disclosure.

In particular, as shown in FIG. 2a, the yaw torque may be determined as follows:

$$M_z = \frac{J_z v \dot{\delta}}{L}$$

wherein L is vehicle wheel base, $J_z$ is the yaw moment of intertia, v is a vehicle speed, and $\dot{\delta}$ is a derivative of a front wheel steering angle δ:

$$\dot{\delta} \approx \frac{L\dot{\omega}_z}{v} = \frac{LM_z}{J_z v} \text{ and } \delta \approx \frac{L}{R} = \frac{L\omega_z}{v}$$

wherein $\omega_z$ is a vehicle yaw rate.

Figure 2B:
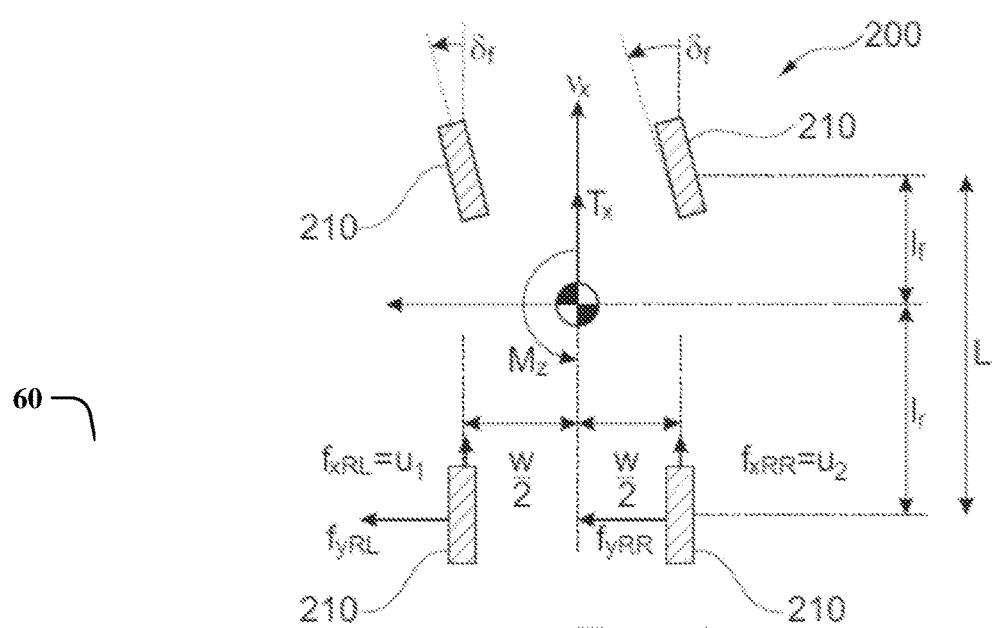

The wheel torque allocator 42 receives the determined yaw torque and determines a wheel torque. The wheel torque may be calculated for at least a total wheel torque required for front axle wheels 210 and at least a total wheel torque required for rear axle wheels 210. FIG. 2b shows the determined wheel torques for each of the rear axle wheels 210:

$$u_1 = -\frac{M_z w}{2}, u_2 = +\frac{M_z w}{2}$$

Further, the wheel torque allocator 42 is connected to a wheel torque actuator 43 such as an electric machine to allocate the determined wheel torque to the respective wheel 210.

Figure 3:
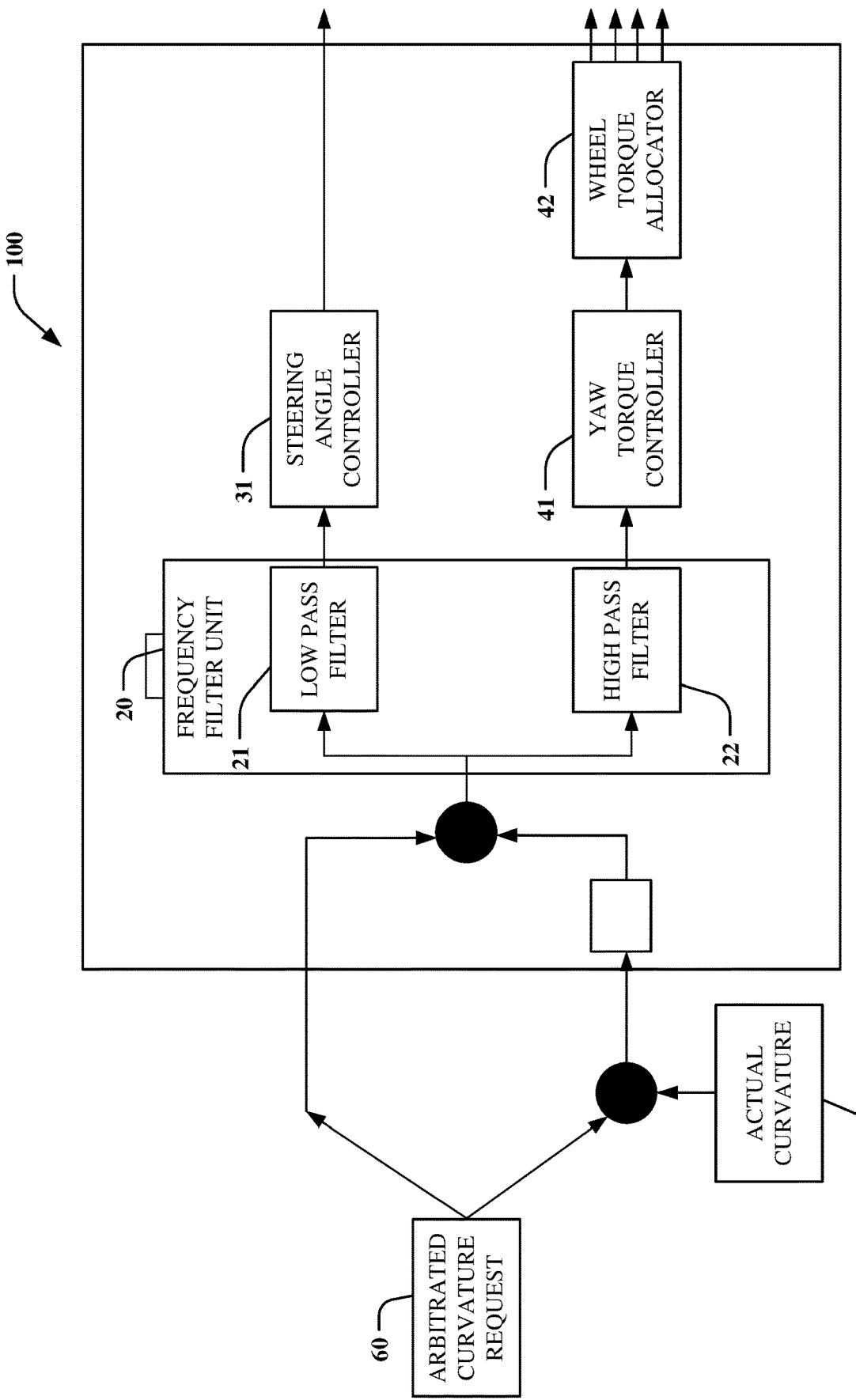
FIG. 3 shows schematically and exemplarily another embodiment of a steering control system according to the present disclosure.

FIG. 3 shows a steering control system 100 for processing a request for driving a curvature. The curvature request may be an arbitration of a human driver's curvature request and estimated curvature request. The arbitrated curvature request 60 is provided with an actual curvature 61 in the steering control system 100, in other words curvature allocator. The arbitrated curvature request is filtered by the frequency filter unit 20 comprising a low pass filter 21 and a high pass filter 22. The steering angle controller 31 receives the low-pass filtered curvature request and determine a steering torque for driving the curvature as follows:

$$L + K_u V_x^2$$

wherein L is wheel base, $K_u$ is an understeer gradient.

Further, the torque vectoring controller 40 receives the high-pass filtered curvature request and determine a wheel torque for driving the curvature as follows:

$$v_x J_z$$

wherein $J_z$ is the yaw moment of intertia and $v_x$ is a vehicle speed.

Accordingly, a smooth and more precise steering action and/or driving a curvature of the vehicle 200 may be performed. Further, a use of two different control units enables an improved control of a desired path and capturing a fast-changing steering request with a fast-response torque control. Moreover, tuning and calibration efforts for the steering action may be reduced.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A steering control system for a vehicle, comprising:
   a frequency filter unit comprising a high pass filter and a low pass filter, wherein the frequency filter unit:
      receives a request for a steering angle,
      filters, via the low pass filter, the request into a low-pass filtered request,
      filters, via the high pass filter, the request into a high-pass filtered request;
   a first control unit that controls respective steering angles of one or more wheels of the vehicle based on a first controlling torque determined as a first function of the low-pass filtered request; and a second control unit that controls respective wheel torques of the one or more wheels of the vehicle based on a second controlling torque determined as a second function of the high-pass filtered request, wherein the first control unit is different from the second control unit.

2. The steering control system of claim 1, wherein the first control unit is a steering angle controller.

3. The steering control system of claim 1, wherein the first control unit controls the respective steering angles of one or more wheels of the vehicle based on a first controlling torque using a steering actuator.

4. The steering control system of claim 3, wherein the steering actuator is an electric power assist steering (EPAS) assembly or a steer-by-wire system.

5. The steering control system of claim 1, wherein the second control unit is a torque vectoring controller.

6. The steering control system of claim 5, wherein the torque vectoring controller comprises a yaw torque controller that determines a steering angle error based of the high-pass filtered request and a current steering angle of the vehicle, and determines a yaw torque based on a steering angle error.

7. The steering control system of claim 6, wherein the torque vectoring controller further comprises a wheel torque allocator that determines a total wheel torque based on the yaw torque.

8. The steering control system of claim 7, wherein the total wheel torque is based on a first total wheel torque required for front axle wheels and a second total wheel torque required for rear axle wheels.

9. The steering control system of claim 8, wherein the wheel torque allocator is connected to a wheel torque actuator to allocate the total wheel torque to the one or more wheels of the vehicle.

10. The steering control system of claim 9, wherein the wheel torque allocator is an electric machine.

11. The steering control system of claim 1, further comprising at least one environment sensor and a path controller, wherein the at least one environment sensor is configured to provide vehicle and road information to the path controller, and the path controller is configured to provide the request for a steering angle to the frequency filter unit.

12. The steering control system of claim 1, wherein a first cut-off frequency of the high pass filter and a second cut-off frequency of the low pass filter are a same frequency.

13. A steering control system for a vehicle, comprising:
a frequency filter unit comprising a high pass filter and a low pass filter, wherein the frequency filter unit:
receives a request for driving a curvature,
filters, via the low pass filter, the request into a low-pass filtered request,
filters, via the high pass filter, the request into a high-pass filtered request;
a first control unit that controls respective steering angles of one or more wheels of the vehicle for driving the curvature based on a first controlling torque determined as a first function of the low-pass filtered request; and
a second control unit that controls respective wheel torques of the one or more wheels of the vehicle for driving the curvature based on a second controlling torque determined as a second function of the high-pass filtered request, wherein the first control unit is different from the second control unit.

14. The steering control system of claim 13, wherein the curvature request is an arbitration of a human driver's curvature request and estimated curvature request.

15. The steering control system of claim 13, wherein the first control unit is a steering angle controller.

16. The steering control system of claim 13, wherein the second control unit is a torque vectoring controller.

17. A vehicle, comprising a driver assistance system comprising:
a steering control system comprising:
a frequency filter unit comprising a high pass filter and a low pass filter, wherein the frequency filter unit:
receives a request for a steering angle,
filters, via the low pass filter, the request into a low-pass filtered request,
filters, via the high pass filter, the request into a high-pass filtered request;
a first control unit that controls respective steering angles of one or more wheels of the vehicle based on a first controlling torque determined as a first function of the low-pass filtered request; and
a second control unit that controls respective wheel torques of the one or more wheels of the vehicle based on a second controlling torque determined as a second function of the high-pass filtered request, wherein the first control unit is different from the second control unit.

18. The vehicle of claim 17, wherein the vehicle is a driver-assisted vehicle or an autonomous vehicle.

19. The vehicle of claim 17, wherein the first control unit controls the respective steering angles of one or more wheels of the vehicle based on a first controlling torque using a steering actuator, and the steering actuator is an electric power assist steering (EPAS) assembly or a steer-by-wire system.

20. The vehicle of claim 17, wherein the second control unit controls the respective wheel torques of one or more wheels of the vehicle based on a yaw torque determined as a function of the high-pass filtered request and a current steering angle of the vehicle.

* * * * *